Nov. 13, 1934.  G. PUTZ  1,980,877
BEER REGULATING AND COOLING APPARATUS
Filed April 23, 1934
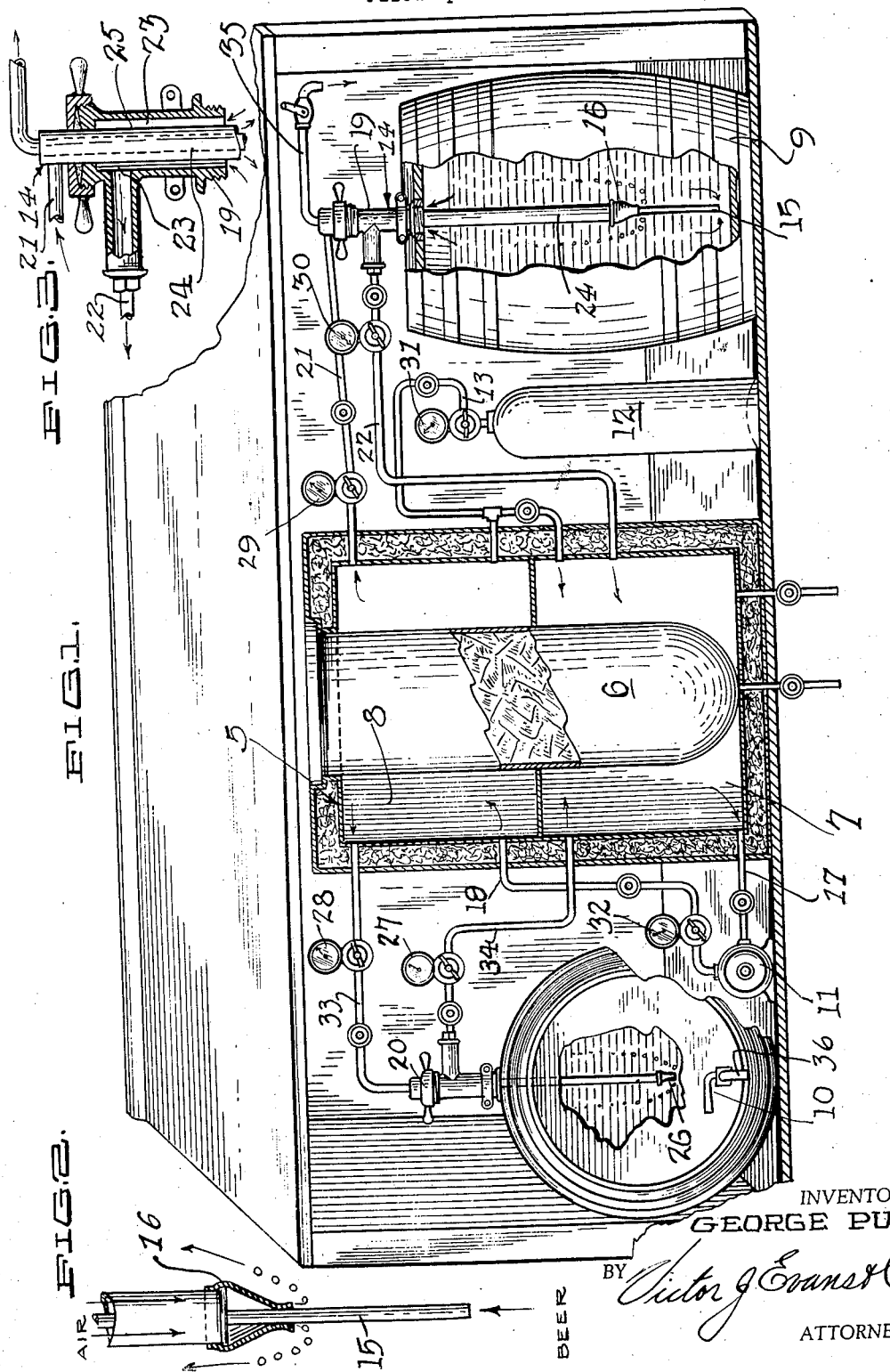
INVENTOR.
GEORGE PUTZ.
BY Victor J. Evans & Co
ATTORNEYS.

Patented Nov. 13, 1934

1,980,877

UNITED STATES PATENT OFFICE 1,980,877

BEER REGULATING AND COOLING APPARATUS

George Putz, San Francisco, Calif.

Application April 23, 1934, Serial No. 722,031

4 Claims. (Cl. 225—1)

This invention relates generally to improvements in beer regulating and cooling apparatus and has particular reference to an improved system in which the beer may always be kept cool and free from excess foam when drawn from the keg or barrel.

The primary object of the invention is the provision of a system for handling beer in bulk in which the cooling coils are dispensed with, thus causing the beer to be free from excess foam, and to be handled in a more sanitary way than under the present system of tapping the barrel or kegs and icing either the keg or coils.

A further object of the invention is the provision of a circulating system in which carbonic gas is circulated by pressure, the carbonic gas being precooled and circulated through the body of the beer in the keg or barrel.

A still further object of the invention is the provision of a beer control system in which all sediment is separated from the beer as beer is drawn from the keg or barrel.

Other objects and advantages will be apparent during the course of the following description.

In the accompanying drawing forming a part of this specification and in which like numerals are employed to designate like parts throughout the same, Fig. 1 is an enlarged perspective view showing the improved cooling system in general, Fig. 2 is an enlarged sectional detail of the beer tube which is inserted into the barrels and discloses the rubber valve means for allowing the circulated gas to enter the beer in said barrels, and Fig. 3 is a sectional detail of the tap means for circulating the cold gas through the barrels of beer and the method of accomplishing the same.

Ordinarily beer is either forced from a keg or barrel which is located below or on a level with the tap and this function is accomplished by means of compressed air or gas as the case may be.

Under the present and improved system it is the principal object of the invention to produce a beer cooling and circulating system in which the beer is drawn quickly, but also causes the same to be drawn without sediment or to be otherwise agitated by the usual method of tapping a barrel of beer.

Primarily my object is the provision of a system in which the beer is subjected to a gaseous pressure and also a precooling medium is used in the system to keep the beer in the proper condition as to pressure and temperature.

Referring particularly to the drawing, the general Figure 1 represents the beer cooling system and comprises a cooling compartment 5 insulated in the usual manner and embodying an ice retaining element 6 in which ice may be included with salt in the usual manner. Said compartment embodies two chambers 7 and 8 and a barrel of beer 9 and another barrel of beer 10 on tap. The barrel 9 is represented as on tap in the usual manner and the barrel 10 is represented as a barrel of steam beer.

The system operates as follows:—

Normally a keg or barrel of beer is placed under a pressure of, say from, five to ten pounds, and when tapped under ordinary circumstances the beer is wild and runs mostly to foam. It is, therefore, the object of my invention to produce a system of handling beer which is not only simple in operation but also preserves and conserves the beer. A pump 11 is the circulating medium and a gas tank 12 is included in the system, which supplies pressure to the chamber 7 in which the ice containing or cooling compartment is included. For instance, as shown in the drawing, the keg or barrel 9 is indicated as on tap and the gas tank 12 is shown as distributing pressure to the chamber 7 of the cooling compartment 5, Figure 1.

In the drawing it will be observed that two barrels are shown on taps and it is to be understood that the following action takes place. Referring to the barrel 9 the usual tap 14 is shown in place and includes the beer tube 15 and a rubber nipple 16, which nipple is shown in detail in Figure 2. The circulating system includes the gas bottle 12 and a circulating pump 11 having an intake line 17 and an outlet line 18 communicating, respectively, with chambers 7 and 8. The taps 19 and 20 are of the usual character, and the tap 19 specifically shown in Figure 3, illustrates the method of keeping pressure on the beer in the barrels.

The general gas circulation for one barrel is as follows:

First gas pressure is drawn from the gas bottle 12, through the outlet pipe 13, and is injected into the chamber 7. The cooled gas is drawn through the pipe 17 by the suction of the pump 11 and is ejected into chamber 8 of the cooling medium 5 by the pipe 18. From the cooling chamber 8 the gas passes through the pipe 21 to the usual tap 14, and thence into the barrel 9 and is permitted to escape into the beer through the nipple 16. After the gas has aerated and cooled the beer it rises to the top of the barrel 9 as disclosed by the directional arrows shown, and is returned to and through pipe 22 to chamber 7, thus completing a full cooling cycle for the barrel 9. It is most desirable when tapping a fresh keg or barrel of beer to keep down the foam and in order to accomplish this, the normal pressure is withdrawn from said keg or barrel and causes the escapement of pressure to the chambers 7 and 8 and thence back to the keg or barrel, and at the same time keeping the temperature of the beer from rising beyond the normal temperature of the circulation system, and thus minimizing the amount of foam.

Referring to Figures 1 and 3 it will be observed that the tap embodies a head 23, a beer tube 15 and a sleeve 24 on which is mounted the nipple 16, as disclosed in Figures 1 and 2, through which the gas escapes.

Referring now to Figure 3 it will be observed that the tap comprises a beer tube 15, a sleeve 24, an air space 25 and permits gas discharge to pipe 22 and thence to the cooling medium 5. The nipple 16 provides means for the release of gaseous pressure to the beer in the barrel 10 without the escapement of beer through the tap 20, which tends to circulate the cooled gas through the keg or barrel of beer. The cooled gas pressure is regulated by the pressure regulators 27, 28, 29, 30, 31 and 32, arranged in the circulating system, said regulators tending to keep the pressure at a predetermined limit of say five or six pounds per square inch.

An inlet line 33 leads from the cooling medium 5 to the tap 20 and a discharge line 34 leads from the tap 20 and permits the gas to return to the chamber 7, after the valves have been duly regulated. The draft tap 35 is attached to the tube 15 of the usual tap 14, as shown. Beer can be withdrawn from the barrel 9 without disturbing the cooling process. Beer can also be drawn in like manner from the barrel 10 by the plug tap 36.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a beer cooling system of the class described, containers for holding bulk beer, a cooling chamber arranged between said containers, a cold air circulating system entering said containers, and pump means for maintaining a constant predetermined air pressure adapted to be circulated through the beer in said containers.

2. In a beer cooling system of the class described, a plurality of containers for holding bulk beer, an air cooling chamber, an air circulating system terminating in taps entering said containers, and means for maintaining a constant air pressure in said system and circulating the same from the cooling chamber and through the beer in said containers, and means for recirculating the same to and through said cooling chamber.

3. In a beer cooling system of the class described, a plurality of containers for holding bulk beer, taps extending into said containers, a cold air circulating system including a cooling chamber connected to said taps, pressure means for maintaining a constant pressure in said system, and means for circulating the cold air through said taps and into the beer and for continuously recirculating the same throughout the system at a predetermined and constant temperature.

4. In a beer cooling and regulating system of the class described, a plurality of bulk containers arranged in a cold air circulating system, taps extending into said containers to allow the withdrawal of beer and the entrance of cold air into the beer, and means for circulating said air throughout the system.

GEORGE PUTZ.